UNITED STATES PATENT OFFICE.

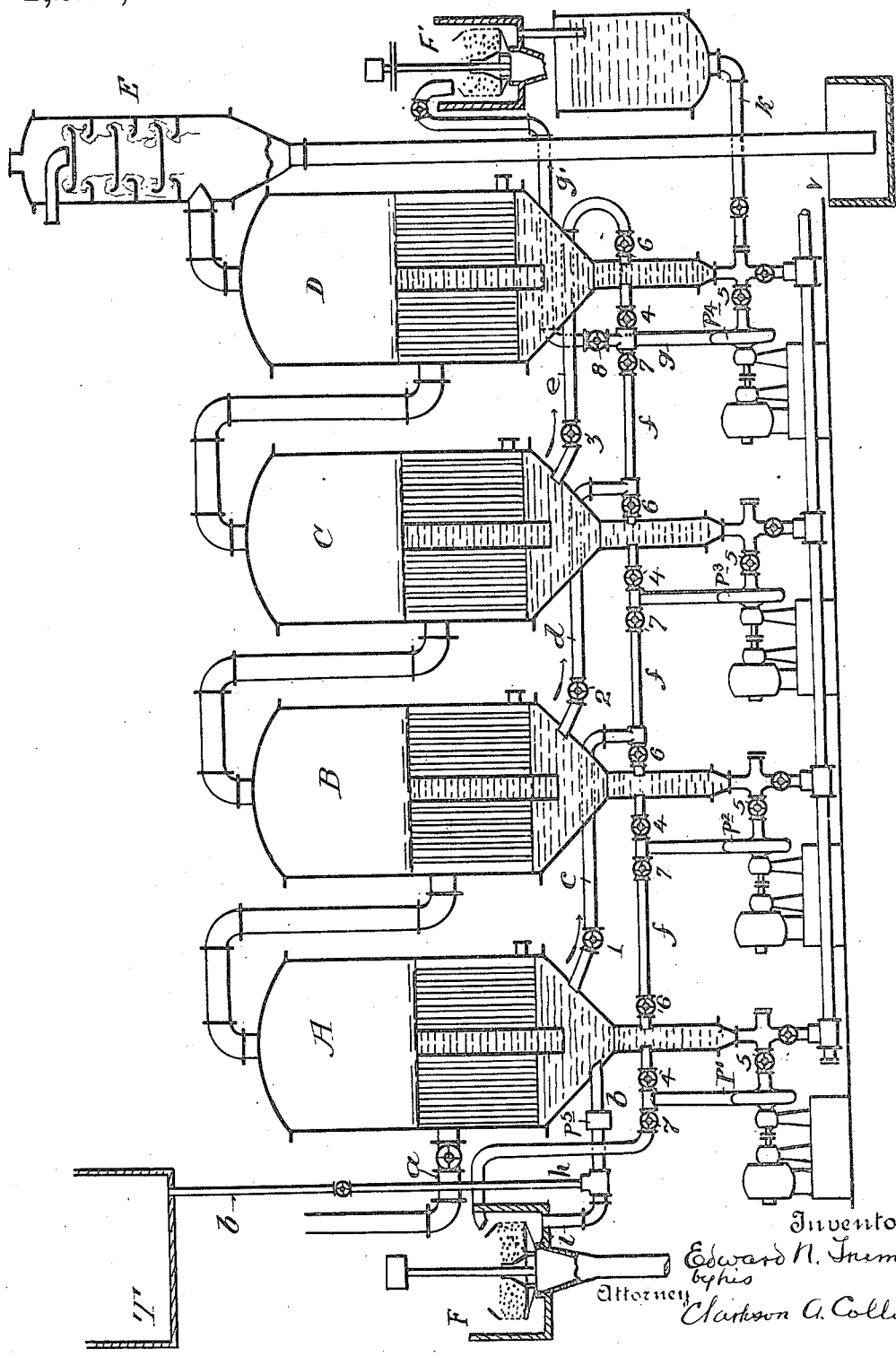

EDWARD N. TRUMP, OF SYRACUSE, NEW YORK, ASSIGNOR TO THE SOLVAY PROCESS COMPANY, OF SOLVAY, NEW YORK, A CORPORATION OF NEW YORK.

PROCESS OF RECOVERING SALTS FROM ADMIXTURES THEREOF IN SOLUTION.

1,216,187.     Specification of Letters Patent.     Patented Feb. 13, 1917.

Application filed March 24, 1916. Serial No. 86,394.

*To all whom it may concern:*

Be it known that I, EDWARD N. TRUMP, a citizen of the United States, residing at Syracuse, in the county of Onondaga and State of New York, have invented a new and Improved Process of Recovering Salts from Admixtures Thereof in Solution, of which the following is a specification.

My invention relates particularly to the separate recovery from a solution of two or more salts, such, *e. g.*, as sodium sulfate and potassium chlorid, which have solubilities differently varying according to the temperature of the solution, and the object of my improvements is to provide a continuous, methodical and efficient method of effecting such separation.

The invention will be best understood by describing it in connection with the accompanying drawing which is a diagrammatic illustration of a multiple effect evaporating apparatus suitably arranged for carrying it into effect. The evaporating apparatus, as shown, consists of four effects of usual construction indicated as A, B, C, D. The concentration of the salt containing solution is effected in the usual manner, effect A being heated by the steam entering it by pipe, *a*, effect, B, being heated by the steam generated in effect, *a*, and so on to the end of the series, the steam formed in effect, D, passing to a condenser, E.

The solution from which the salts are to be recovered is admitted in the first instance from a feed tank, T, through pipe, *b*, to effect, A. From effect, A, the solution concentrated by evaporation in each effect passes in succession by pipes, *c, d,* and *e,* to effects, B, C, and D. In each case the solution is taken out of the effect at a point where the solution is relatively free from precipitated salts and enters the succeeding effect through pipe, *f*, which connects the lower portions of the several effects in which the salts formed are, in the first instance, precipitated.

In connection with each effect is a pump, P, whereby (except in the case of effect D) upon opening valves, 4, and 5, and closing valves, 6 and 7, on either side of the effect, the solution can be circulated at will through the lower portion of each effect and its concentration in salts thereby increased. In the case of effect, D, it is necessary, in order to effect circulation of the solution, to also close valve, 8, located in pipe, *g'*, which leads from pipe, *f*, to the filter, or centrifugal separator, F'. By closing the valves, 4, and opening the valves, 6 and 7, which are interposed in the pipe, *f*, between each two effects, and valves, 5, the pumps, P, operate to force the solution from the lower part of each effect, together with the salts precipitated therein, through the pipe, *f*, to the effect having the next higher temperature, as from effect, D, to effect, C, and effect, C, to effect, B, and from effect, B, to effect, A. From effect, A, upon opening valves, 5 and 7, valve, 4, being closed, the salt, together with the solution, in the lower portion thereof is forced by pump, P', through pipe, *h*, to a filter or centrifugal separator, F, where the salt is separated from the mother liquor.

By partially opening valve, 4, a portion of the liquor will be circulated through the adjoining effect while another portion will be forced into the next higher effect so that the operations of circulating the liquor to increase concentration and of transferring the precipitated salt from effect to effect will be performed at the same time.

It will be understood that the temperature of the solution is highest in effect, A, and decreases through the several effects, being lowest in effect, D.

At the temperatures maintained that salt, as potassium chlorid, which decreases in solubility with decrease of temperature, will in the first instance precipitate mainly in the lower portion of effect, D, while that salt, as sodium sulfate, which decreases in solubility with increase of temperature will precipitate in effect, A, as well as in the other effects.

As the mixed salts are transferred through the operation of pumps, P, through pipe, *f*, through effects, C, and B, and past the inlets of pipes, *c* and *d*, to pipe, *f*, they are brought into contact with unsaturated liquor of progressively increasing temperature in each successive effect so that the more soluble salt will be dissolved out, and, in effect, A, there will be found only the salt which has less solubility at the higher temperature. This is removed from the mother liquor in the filter or centrifugal, F. The mother liquor, carrying in solution the more soluble salt, passes from the centrifugal, F, through pipe, $i$, and is added to the incoming fresh liquor and again enters the system of effects through pipe, $b$, so that the solution in the effects becomes more concentrated in the more soluble salt.

It will be evident that the operation may be continued to a point at which the concentration of the more soluble salt in the solution will be such that this salt will be precipitated at the highest temperature in effect, A. Just before this point of concentration is reached, however, valves, 4 and 7, in pipe $f$, on either side of pipe, $g$, are closed and valve, 8, in pipe, $g'$, is opened and by the operation of pump, P, adjacent to effect, D, the more soluble salt in effect, D, is forced into the filter or centrifugal, F'. In this manner the concentration of the liquor in the more soluble salt is reduced below the point at which its precipitation at the high temperature is possible and this salt is recovered at its maximum degree of purity and largely separated from the less soluble salt.

The mother liquor from the centrifugal, F', is carried back to the system through pipe, $k$, for the recovery of any contained salts.

In this manner by continuously transferring the precipitated salts in the direction of the effect of highest temperature, from which the least soluble salt is removed, while maintaining such a temperature that the more soluble salt will not normally be precipitated therein and thus dissolving the more soluble salt formed, and at the same time concentrating the solution in the more soluble salt and transferring the concentrated solution in the opposite direction and periodically removing the precipitate of the more soluble salt from the effect of lowest temperature when the solution has reached the proper point of concentration therein, an efficient separation of the salts is effected.

What I claim as new and desire to secure by Letters Patent is:

1. The process of separately recovering salts from admixtures thereof in solution, which consists in concentrating the solution in a multiple effect evaporator, transferring the solution from the effect of highest temperature through the several effects to the effect of lowest temperature and transferring the precipitated salts through the several effects to the effect of highest temperature whereby the more soluble salt is dissolved, and removing the salts at the opposite ends of the series of effects.

2. The process of separately recovering salts from admixtures thereof in solution which consists in concentrating the solution in a multiple effect evaporator, transferring the solution through the several effects in one direction and transferring the precipitated salts through the several effects in the opposite direction, whereby the more soluble salt is dissolved, and removing the precipitated salts separately at the opposite ends of the series of effects.

3. The process of separately recovering salts from admixtures thereof in solution which consists in evaporating the solution in a multiple effect evaporator, transferring the solution through the several effects from the effect of highest temperature to the effect of lowest temperature, transferring the precipitated salts through the several effects in the opposite direction, washing the salts in solution of progressively higher temperature and thereby dissolving the more soluble salt, removing the less soluble salt from the effect of highest temperature and returning the mother liquor to the effects and periodically removing the more soluble salt from the effect of lowest temperature while its solution concentration is such that it will not precipitate in the effect of highest temperature.

In testimony whereof I hereto affix my signature, this 22nd day of March, 1916.

EDWARD N. TRUMP.